Figure 1:
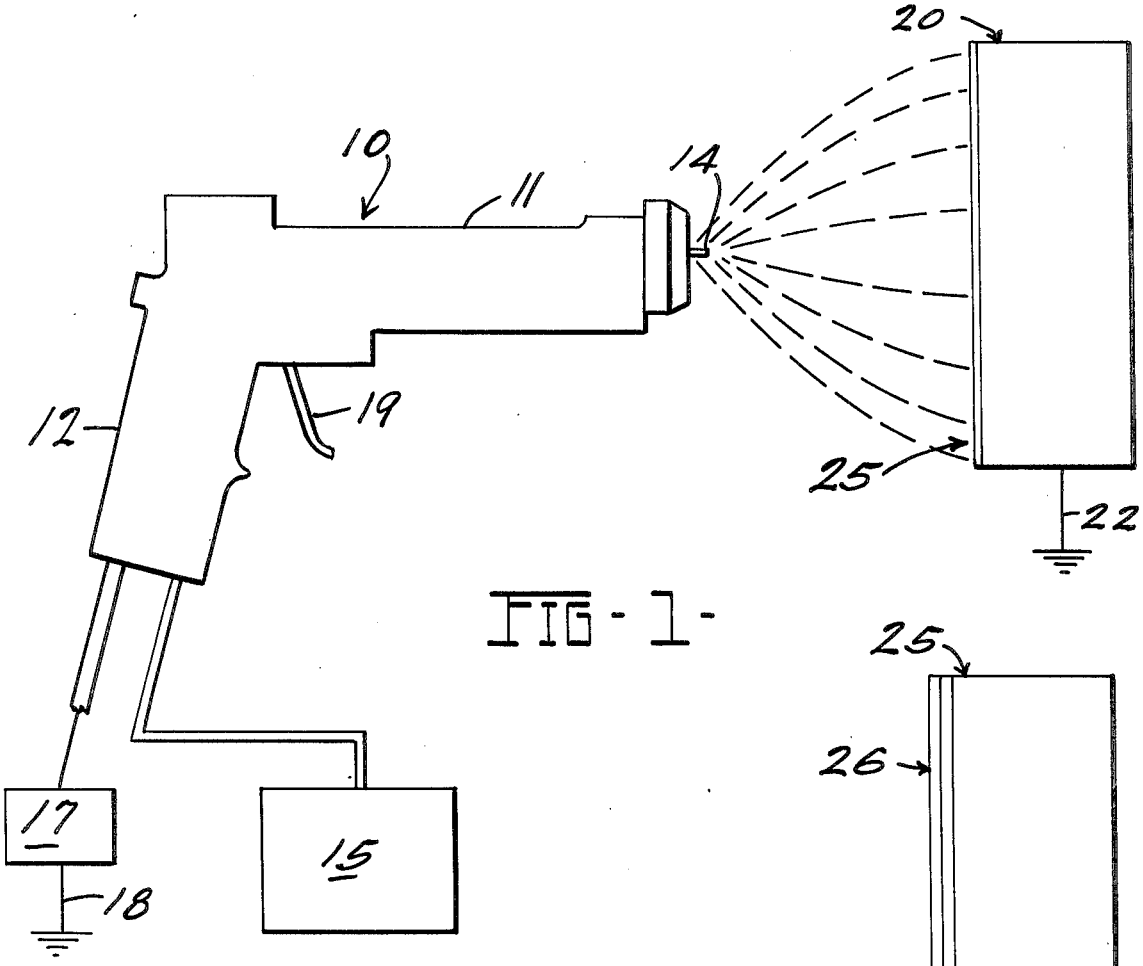
Figure 2:
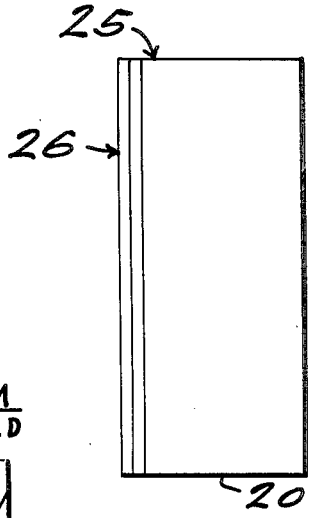
Figure 3:
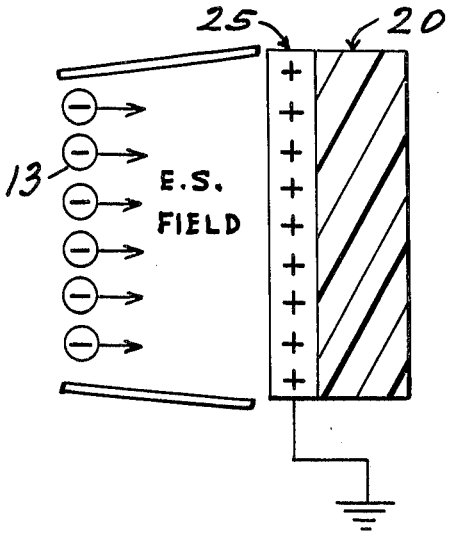
Figure 4:
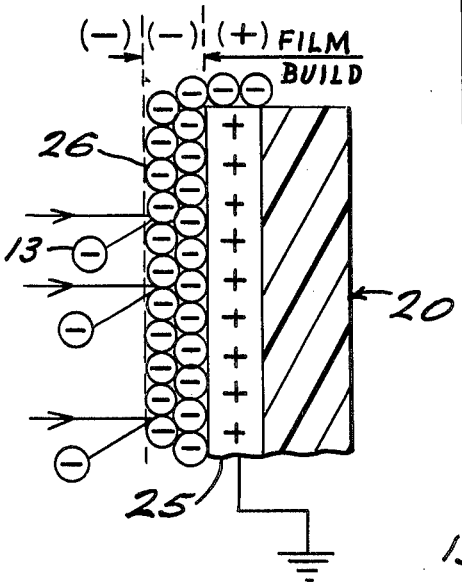
Figure 5:
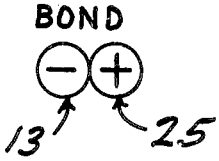
Figure 6:
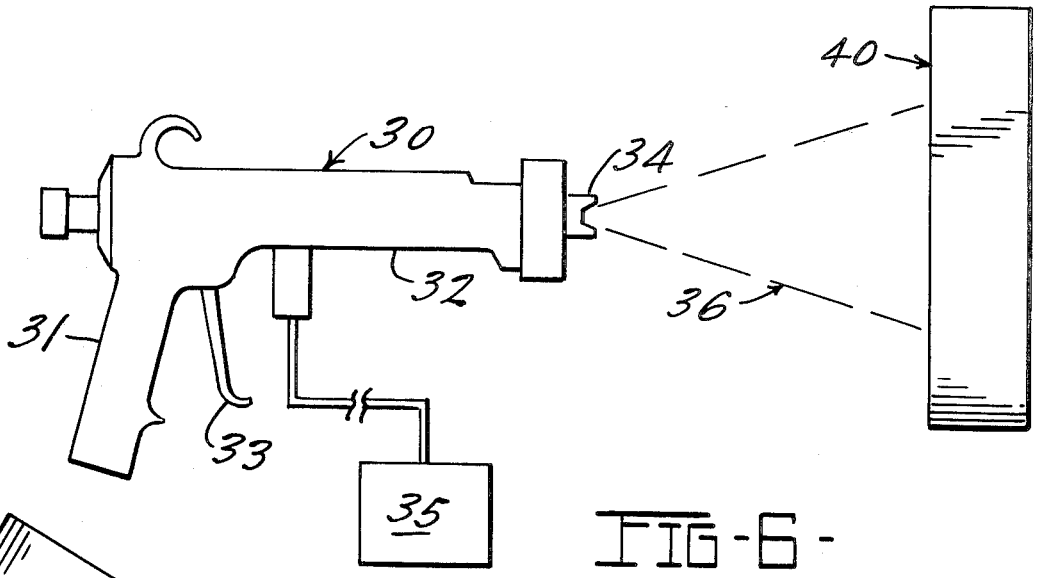
Figure 7:
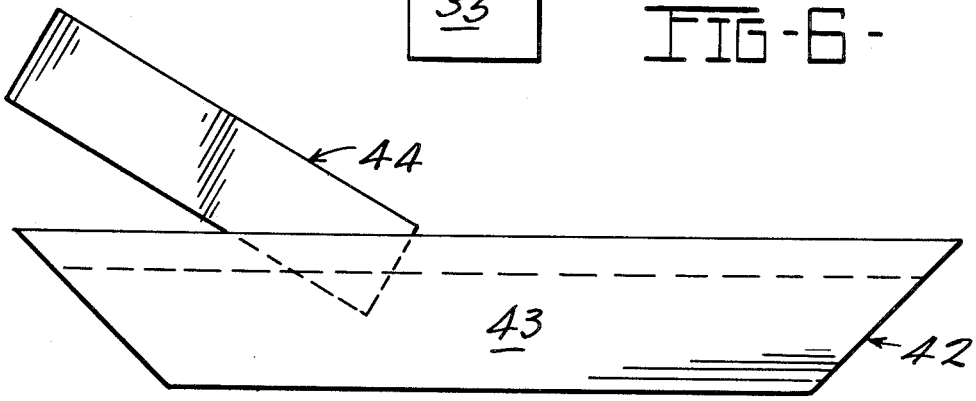
Figure 8:
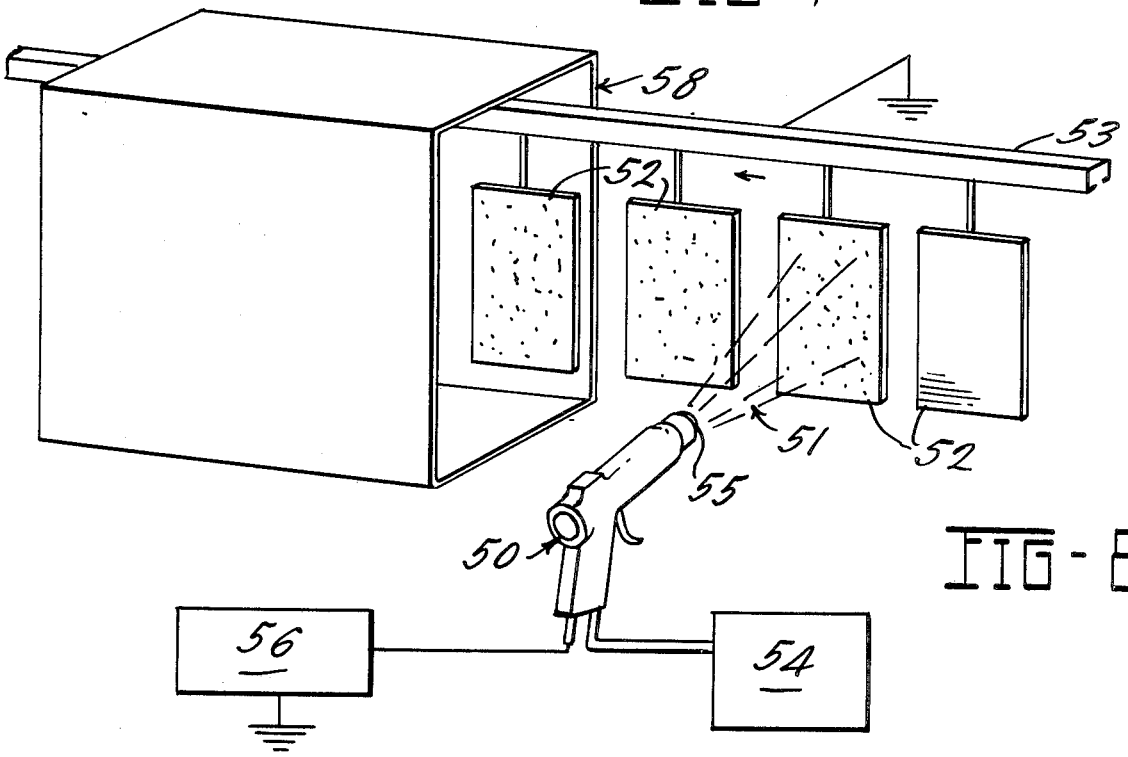
Figure 9:
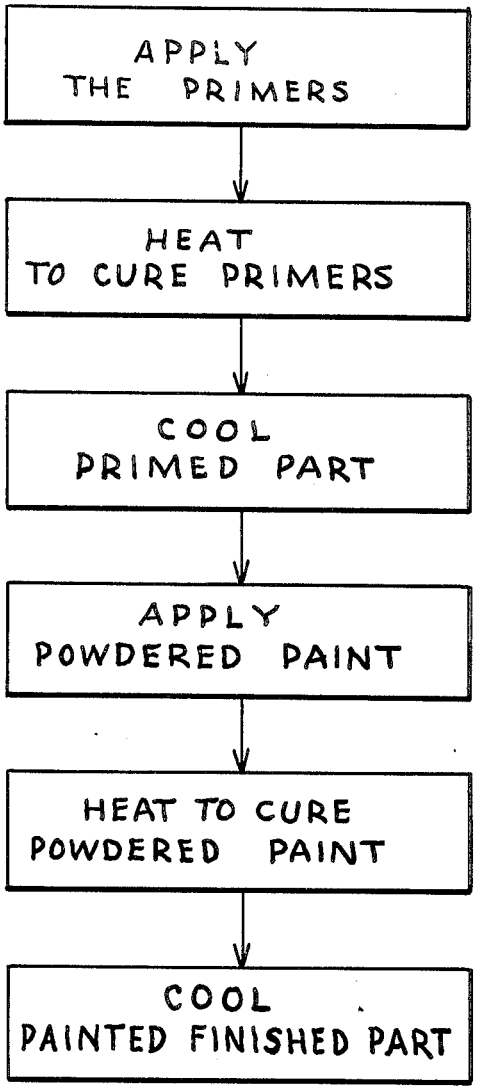

United States Defensive Publication [19] (H) [11] T982,004

Klusendorf et al. [43] May 1, 1979

[54] POWDER COATED RESINOUS ARTICLE

[76] Inventors: Lloyd Klusendorf, 1650 Londondale Pkway.; Roger Lehman, 660 King Ave., both of Newark, Ohio 43055

[21] Appl. No.: 876,457

[22] Filed: Feb. 9, 1978

Related U.S. Application Data

[63] Continuation of Ser. No. 535,400, Dec. 23, 1974, abandoned.

[51] Int. Cl.[2] ..... B05D 1/36; B05D 7/00; B05D 1/04

[52] U.S. Cl. ..... 428/339; 427/27; 427/195; 427/202; 427/407 G; 427/419 R; 428/413; 428/480; 428/500; 428/539

[57] ABSTRACT

A method and product relating to a powdered coated resinous article. The surface of the resinous article is sealed to resist the effects of gases released from the article during heating. The sealing layer may contain a lead silicate chromate additive. A conductive exterior surface is then formed on the article and subsequently a powder paint is applied to the article under the influence of an electrostatic field. The coating is then heated sufficiently to merge the particles into a continuous film. The powder coating may be acrylic, polyester or epoxy. The sealing and forming a conductive layer may be done in one operation.

31 Claims, 3 Sheets Drawing,

33 Pages Specification

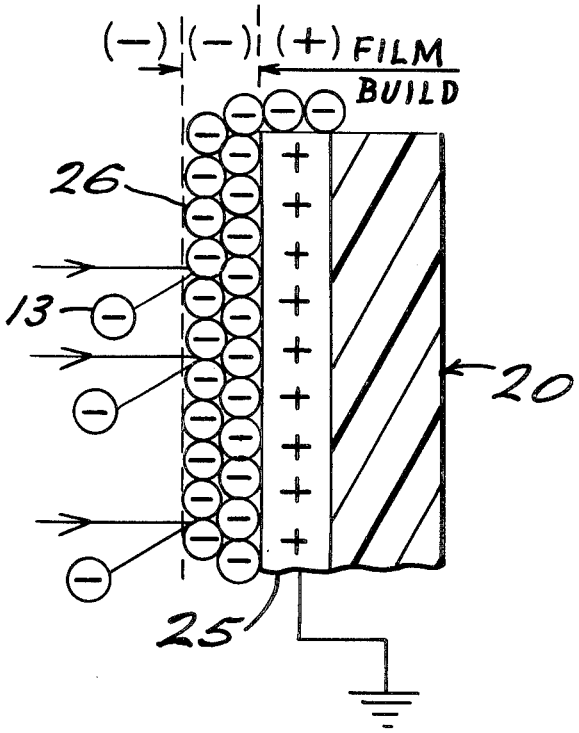

The file of this unexamined application may be inspected and copies thereof may be purchased (849 O.G. 1221, Apr. 9, 1968).